(12) United States Patent
Mazur et al.

(10) Patent No.: US 8,924,519 B2
(45) Date of Patent: Dec. 30, 2014

(54) AUTOMATED DNS CONFIGURATION WITH LOCAL DNS SERVER

(75) Inventors: Leszek Mazur, Kirkland, WA (US); Ying Qiu, Issaquah, WA (US); Sean D. Daniel, Victoria (CA)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 12/611,255

(22) Filed: Nov. 3, 2009

(65) Prior Publication Data

US 2011/0106919 A1   May 5, 2011

(51) Int. Cl.
G06F 15/177 (2006.01)
H04L 12/24 (2006.01)
H04L 12/26 (2006.01)
H04L 29/12 (2006.01)
H04L 29/08 (2006.01)

(52) U.S. Cl.
CPC ............. *H04L 41/12* (2013.01); *H04L 61/2015* (2013.01); *H04L 61/1511* (2013.01); *H04L 43/0811* (2013.01); *H04L 67/1036* (2013.01); *H04L 67/1002* (2013.01); *H04L 29/12226* (2013.01); *H04L 29/12066* (2013.01)
USPC .......................................... 709/220; 709/245

(58) Field of Classification Search
USPC ................................................. 709/220, 245
See application file for complete search history.

(56) References Cited

U.S. PATENT DOCUMENTS

| | | | |
|---|---|---|---|
| 6,012,088 A | 1/2000 | Li et al. | |
| 6,810,411 B1* | 10/2004 | Coughlin et al. | ............. 709/203 |
| 7,586,905 B2 | 9/2009 | Okmianski et al. | |
| 2002/0065904 A1* | 5/2002 | Hartman et al. | .............. 709/220 |
| 2004/0083306 A1* | 4/2004 | Gloe | .............................. 709/245 |
| 2006/0187858 A1 | 8/2006 | Kenichi et al. | |
| 2009/0132698 A1 | 5/2009 | Barnhill, Jr. | |
| 2009/0141692 A1 | 6/2009 | Kasslin et al. | |

OTHER PUBLICATIONS

Kim, et al., "Home Network Electrical Appliance Control with the UPnP Expansion", retrieved at <<http://ieeexplore.ieee.org/stamp/stamp.jsp?tp=&isnumber=&arnumber=4021278>>, Nov. 2006, pp. 6.

Guttman, Erik, "Service Location Protocol: Automatic Discovery of IP Network Services", retrieved at <<http://ieeexplore.ieee.org/stamp/stamp.jsp?tp=&isnumber=&arnumber=780963>>, Jul. 1999, pp. 10.

Bloniarz, et al., "Automatic Service Discovery in IP Networks—A Developer's Perspective", retrieved at <<http://www.streamunlimited.com/files/bloniarz_service_discovery.pdf>>, Sep. 29, 2009, pp. 5.

* cited by examiner

*Primary Examiner* — Thomas Dailey
(74) *Attorney, Agent, or Firm* — Steve Wight; Judy Yee; Micky Minhas

(57) ABSTRACT

A client process may identify a local DNS server and may change a DHCP-supplied DNS setting to the local DNS server when the local DNS server is present. The client process may periodically monitor the local DNS server and, if the local DNS server is not present, the client process may revert the DNS setting to the originally supplied DHCP DNS setting. The client process may actively monitor the local DNS server by initiating communication with the local DNS server, or may passively monitor by listening for activity by the local DNS server.

20 Claims, 4 Drawing Sheets

AUTOMATED DNS CONFIGURATION WITH LOCAL DNS SERVER

BACKGROUND

Many local networks use Dynamic Host Configuration Protocol (DHCP) to configure devices that join a network. When a device joins the network, the device may perform a query to locate a DHCP server and may download certain parameters that are used by the device to configure a network connection. Typically, these parameters include a network address for the device and a Dynamic Name System (DNS) server that may resolve friendly names into Internet Protocol (IP) addresses.

In a typical home or small business environment, a device such as a cable modem or Digital Subscriber Line (DSL) modem may serve as a gateway to the Internet, and may also provide DHCP and other services to devices within a local area network. Such devices are often pre-configured by a network provider with default DHCP settings that allow a user to connect to the Internet. Such default DHCP settings may include a reference to a DNS server that may be managed by the network provider and may provide DNS name resolution for any device connected to the Internet.

In some local area networks, a second DNS server may be used to provide DNS services within the local area network. The local DNS service may allow devices within the local area network to communicate with each other to share files and services within the local area network. Typically, these local connections are within the bounds of the local area network and are not accessible from the Internet.

SUMMARY

A client process may identify a local DNS server and may change a DHCP-supplied DNS setting to the local DNS server when the local DNS server is present. The client process may periodically monitor the local DNS server and, if the local DNS server is not present, the client process may revert the DNS setting to the originally supplied DHCP DNS setting. The client process may actively monitor the local DNS server by initiating communication with the local DNS server, or may passively monitor by listening for activity by the local DNS server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
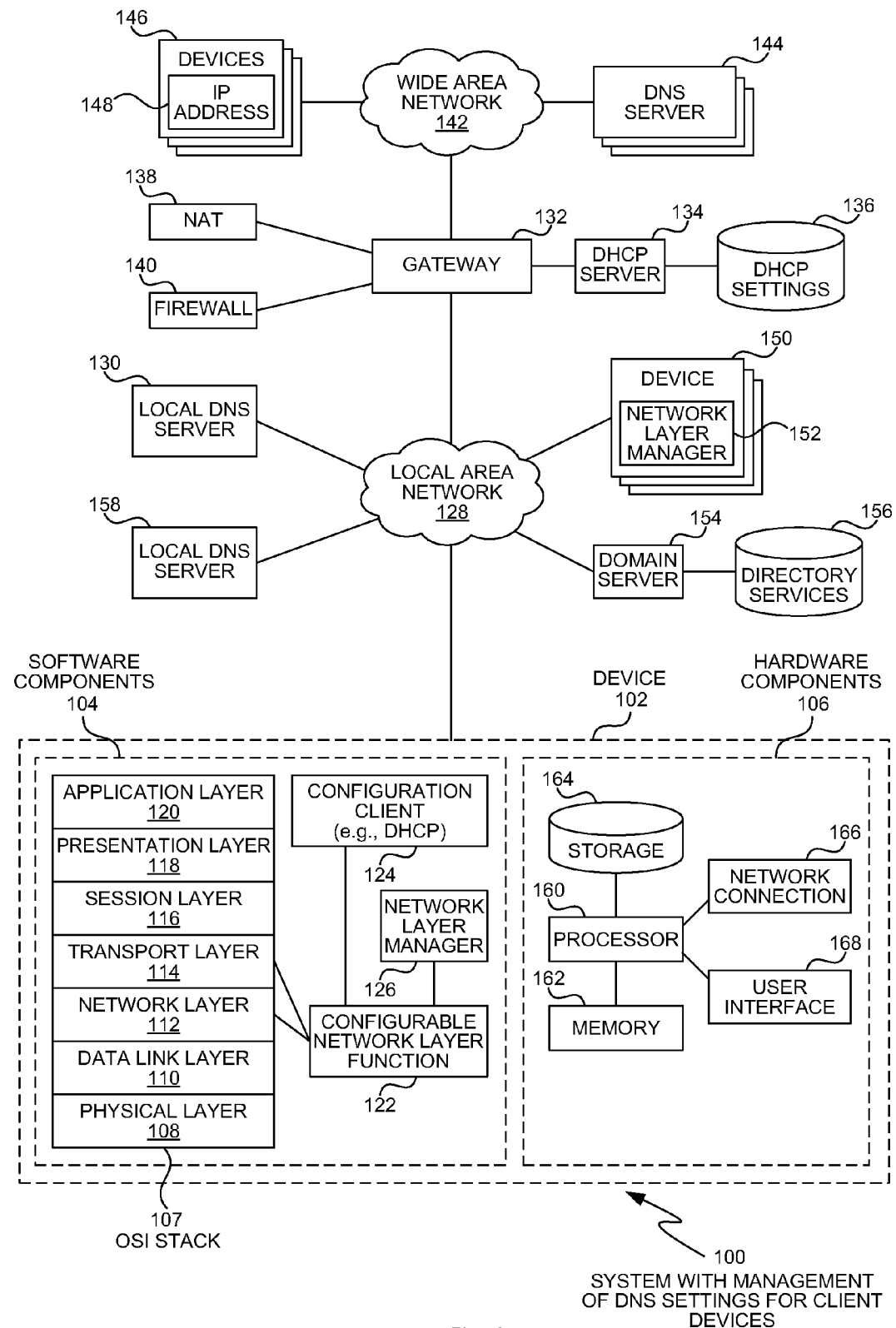
FIG. 1 is a diagram illustration of an embodiment showing an environment in which a device may change DNS settings based on the presence of a local DNS server.

A client device within a local area network may change a DNS server address supplied by a DHCP or other configuration server when a DNS server is present within the local area network. The response from the configuration server may contain an address for a DNS server that may be outside the local area network. When the local DNS server is detected, the client device may change the network connection settings to include the local DNS server. When the local DNS server is no longer detected, the client device may change the network connection settings to revert back to the original DNS server.

The client device may be configured to automatically change DNS server settings supplied by a configuration server based on the presence of a local DNS server. This may allow client devices to have a default configuration that enables Internet or wide area network access, and additional local area network access when a DNS server is present.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied (embedded?) in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a network environment in which a client device may sense a local DNS server and update connection settings for the client device. Embodiment 100 is a simplified example of a network environment in which local and remote DNS servers may operate.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 may be an example of a typical local area network environment that may be found in a home or business. Typically, the local area network may be connected to a wide area network, such as the Internet, through a gateway device. The gateway device may be a cable modem, Digital Subscriber Line (DSL) modem, wireless access radio, or other device. Such devices often come preconfigured with settings that allow a consumer to plug in the device, connect a computer, and have that computer be able to connect to the Internet or other wide area network.

Dynamic Host Configuration Protocol (DHCP) is one technology that automates the network configuration of devices. DHCP operates with two devices: a client and a server. The client device may request network configuration information from the server, and the server may send the network configuration information that the client may use to connect to the network and begin to communicate across the network.

The information provided by the DHCP server may include a network address for the device, a default gateway, a subnet mask, and other information, such as time servers, domain name, and more.

The DHCP server provides a network address for the device by managing a database of network addresses and assigning an unused network address to the device. In many implementations, the DHCP server will provide a lease for a network address that may expire after a certain period of time. The device, if still connected to the network, may renew the lease and continue to use the network settings.

A Domain Name Server (DNS) address may be included in the DHCP settings sent by the DHCP server. The DNS address may point to a Domain Name Server, which is a technology used to resolve a device name with an address, typically an Internet Protocol (IP) address. In some environments, the DNS server may resolve a device name using IPv4 addresses, while other environments may use IPv6 addresses or some other addressing scheme.

The default DNS address included in a typical preconfigured gateway device points to a DNS server located on the Internet or wide area network. In many cases, such a default setting may allow a user to plug in the gateway, attach a computer that has a DHCP client, automatically connect to the Internet, and be able to browse websites or access various hosts or devices on the Internet.

A local area network may have multiple devices that may share information and communicate with each other. In one use scenario, a local area network may have a small server device on which pictures or other files are stored, plus several desktop or laptop computers that may wish to access the pictures or files.

Devices in a local area network that does not have a local DNS server may communicate, but only by using IP addresses for the other devices. In an IPv4 environment, an IP address may be clumsy and difficult to type, as the address may be composed of four numbers up to three digits long. In an IPv6 environment, the IP address may consist of up to 32 digits that may be both numbers and characters. Typing such addresses can be error prone and tedious.

In order to facilitate connections, a local DNS server may translate friendly names to the complex addresses, allowing a user to refer to other devices using friendly names within the local area network. The local DNS server may gather friendly names from the various devices attached to a local area network, then respond to queries to resolve the names into network addresses.

The local DNS server may be made available to client devices within a local area network when the client devices detect the local DNS server, then modify the network connectivity settings to add the local DNS server as a resource for resolving names.

The device 102 is illustrated as having software components 104 and hardware components 106. The hardware and software components represent typical components that may make up a general purpose computing device. The device 102 may be a server or client computer, such as a desktop or laptop computer. In some cases, the device 102 may be a portable device, such as a wireless netbook computer, hand held cellular telephone, personal digital assistant, or other device. The device 102 may also be a network enabled printer, router, wireless access point, network appliance, storage system, gateway device, or any other device that may connect to a network. In some cases, the device may or may not have all of the components illustrated but may perform the functions described.

The software components 104 may be designed using an Open System Interconnection Reference Model (OSI) layered communications stack 107. The OSI stack 107 is a common architecture for communications. The physical layer 108 may define the electrical and physical specifications for device. This layer may define the pins, voltages, cable specifications, hubs, repeaters, network adapters, and other physical components.

The data link layer 110 may define the functional and procedural mechanisms to transfer data between network entities, and to detect and possibly correct errors that may occur in the physical layer 108. The data link layer 110 may be capable of transferring data between nodes of a local area network or a wide area network. The data link layer 110 may deal with local delivery of data frames between devices, but do not cross the boundaries of a local network.

The network layer 112 may define the functional and procedural mechanisms for end to end data delivery including routing through intermediate hosts. In many networks, data may be organized into packets which may be routed through various network connections, gateways, routers, and other devices to a destination. The Internet Protocol (IP) is a typical example of a network layer operation, although the Internet Protocol does not strictly follow the OSI model, but is considered an example of a network layer mechanism for the purposed of this specification.

The transport layer 114 may define the functional and procedural mechanisms for transparent transfer of data between end users, which may provide reliable data transfer services to upper layers. The transport layer 114 may control the reliability of a given link though flow control, segmentation/desegmentation, and error control. The Transmission Control Protocol (TCP) and User Datagram Protocol (UDP) are two examples of protocols that may operate on a transport layer 114. The TCP and UDP protocols may not strictly comply with the OSI transport layer model, but are considered examples of transport layer mechanisms for the purposes of this specification.

The session layer 116 may control the dialogues or connections between devices, such as computers. The session layer 116 may establish, manage, and terminate connections between a local and remote application. The session layer 116 may provide full duplex, half duplex, or simplex operation, and may establish checkpointing, adjournment, termination, and restart procedures. Some of the functions described above may be performed within the TCP protocol.

The presentation layer 118 and application layers 120 are higher level layers that may deal with how data are manipulated by an application.

A configurable network layer function 122 may perform the functions of configuring the network layer function 122 to operate within a network. In some embodiments, the network layer function 122 may modify the settings used by TCP/IP protocols to communicate within a local area network 128 or a wide area network 142.

A configuration client 124 may provide the initial configuration inputs to the configurable network layer function 122. An example of a configuration client 124 may be a DHCP client that may request configuration information from a DHCP server.

The configuration client 124 may detect that a connection is made to the local area network 128. When the connection is made, the configuration client 124 may broadcast a request across the local area network 128 for a configuration server, which may be a DHCP or other type of configuration server. The configuration server may gather several settings that may be used to set up the various OSI layers that deal with network functions in the network layer function 122.

The configuration server may provide many different configuration settings. In a simple system, the configuration server may provide an address and subnet mask for the device 102 to use, and for network addresses for a gateway 132 and a remote DNS server 144. More complex configuration servers may provide addresses for time servers, as well as other configuration information.

The configuration server may be a gateway device 132 that provides a DHCP server 134. The DHCP server 134 may use DHCP settings 136 that may be configurable.

The gateway device 132 may be a device that connects the local area network 128 to a wide area network 142. A typical home or small business may use a cable modem, DSL modem, wireless connection device, satellite modem, or other device to connect a local area network 128 inside the home or small business to a wide area network 142 such as the Internet. In some cases, the wide area network 142 may be a network internal to a company or large enterprise and such a wide area network may or may not connect to the Internet.

In many cases, a consumer-oriented or a business-oriented gateway device may be supplied by a network operator preconfigured with DHCP or other configuration settings. A network operator may be a telecommunications company that may provide connectivity services, such as Internet connectivity, to various subscribers. In many cases, such network operators provide a DNS server 144 that may be available through the wide area network 142.

The remote DNS server 144 may resolve addresses for devices 146. A request may include a domain name, and the remote DNS server 144 may respond with an IP address 148 that may be used to access the device 146. The Internet has a series of DNS servers that maintain a distributed database of all the available domain names across the Internet. The highest level servers in the Internet DNS system are known as root name servers.

The remote DNS server 144 may perform queries to the root servers or other Internet DNS servers when the remote DNS server 144 cannot resolve a particular address. In many cases, the remote DNS server 144 may keep a cache of frequently queried domain names and addresses and may serve to offload the Internet DNS system and provide faster response times than the Internet DNS service.

When a gateway device 132 is provided to a customer, the gateway device 132 may include DHCP settings 136 that may include an address for the remote DNS server 144. Such a setting may allow any device that uses DHCP to connect to the local area network 128 and connect to the Internet, for example.

The gateway device 132 may also provide other services, such as Network Address Translation (NAT) 138, firewall services 140, and other services such as Virtual Private Network (VPN) and others. In some embodiments, the gateway device 132 may provide these services in a single device so that a consumer or installer merely plugs in the device and the network may begin to operate. In other embodiments, two or more devices may be used to provide the set of services.

The network layer manager 126 may modify the settings provided by the DHCP server 134 and set by the configuration client 124. Specifically, the network layer manager 126 may sense that a local DNS server 130 is present on the local area network 128. When the local DNS server 130 is sensed, the address for the local DNS server 130 may be added to the appropriate layer in the OSI stack by the network layer function 122 so that address resolution queries will be directed to the local DNS server 130.

In some embodiments, the network layer manager 126 may remove references to the remote DNS server 144 in the network layer function 122 and replace those references with references to the local DNS server 130. Such a change may be used when the local DNS server 130 may be capable of resolving addresses for devices on either the local area network 128 or the wide area network 142.

The network layer manager 126 may add references to the local DNS server 130 while keeping the references to the remote DNS server 144 when the local DNS server 130 is sensed. Such a change may be used when the local DNS server 130 may be limited to resolving addresses within the local area network 128 and may not have capabilities to resolve addresses in the wide area network 142. Other embodiments may add the local DNS server without removing the remote DNS server for other reasons as well.

In some embodiments, the network layer manager 126 may replace DNS references with the reference to the local DNS server 130. When replacing the DNS references, references to the local DNS server 130 may be added, then reference to other DNS servers may be removed. In embodiments where the DNS references are replaced, the adding and removing operation may be done at the same time.

A network layer function 122 may be capable of maintaining two or more references to DNS servers. In cases where two local DNS servers 130 and 158 are detected, the network layer manager 126 may add reference to both local DNS servers 130 and 158 to the network layer function 122.

The local DNS server 130 may populate and maintain a database of local hostnames and addresses. The local hostnames and addresses may be gathered passively, for example by monitoring network communication between other devices. In some embodiments, the local DNS server 130 may monitor DHCP requests to identify devices that are joining the local area network 128 or renewing licenses from the DHCP server 134.

The local DNS server 130 may actively populate a database of local hostnames and addresses by actively querying the DHCP server to retrieve the address leases and the hostnames associated with each address lease. In some embodiments, the local DNS server 130 may retrieve the addresses for each device from the DHCP server 134 and may query each device separately to gather other details such as hostname.

A local DNS server 130 may populate a database of local hostnames by receiving registrations from the various devices. In some network environments, various devices may detect a local DNS server 130 and may transmit a hostname registration to the local DNS server 130. The local DNS server 130 may interact with the device and populate the database accordingly.

A local domain server 154 may provide directory services 156 to devices on the local area network. The local domain server 154 may provide login authentication as well as other services. The local domain server 154 may maintain directory services that manage users and devices attached to the local area network 128.

A local DNS server 130 may access the directory services 156 to provide name resolution. In such an embodiment, the local DNS server 130 may retrieve a list of host names and addresses that are generated by the local domain server 154. In some embodiments, the local DNS server 130 may operate as part of a domain server 154 and may be a service provided on a local domain server 154.

In some cases, a local DNS server 130 may use several different active or passive mechanisms as well as database queries to directory services or DHCP servers to populate and manage a database for DNS queries.

In many embodiments, a second local DNS server 158 may be a duplicate of a primary local DNS server 130. The second local DNS server 158 may be used at times when the primary local DNS server 130 is taken offline for some reason.

The software components 104 may be configured in different manners. In some embodiments, the functions of a configurable network layer function 122 may be an operating system function. As such, the configurable network layer function 122 may be embedded into an operating system or may be an option or component that is managed by an operating system.

Similarly, the configuration client 124 may be an operating system level component. In some devices, the configuration client 124 may be an optional component that may be enabled or disabled. Some embodiments may design the configuration client 124 to be an application or service as opposed to an embedded operating system function.

The network layer manager 126 may also be an operating system function in some embodiments. Other embodiments may design the network layer manager 126 to be an application that operates on top of the operating system of the device 102.

The network layer manger 126 may be an application that may be installed when the device 102 joins the local area network. The application may be installed manually, buy inserting a disk or other media into the device and performing an installation routine, or may be installed automatically by connecting to a local server or workgroup manager.

The devices 150 that may include a network layer manager 152 may be any network attached device that may use a DNS service, or may be accessed by other devices. For example, a network printer may access a local DNS service to register itself with a friendly hostname so that other devices may access the printer without having to type in a network address.

Other devices 150 may be desktop computers, laptop computers, server computers, wireless devices such as netbook computers, mobile telephones, personal digital assistants, or other devices. In some cases, the devices 150 may be peripheral devices such as printers, scanners, network enabled cameras, data collection devices, projectors or other output devices, or any other device. The devices 150 may also be network routing and management devices, such as managed switches, hubs, routers, wireless access points, and the like. This list is not comprehensive, but serves as examples of the wide variety of devices.

Each of the devices 150 may have a network layer manager 152 that may operate like the network layer manager 126. One example of the method of operation of a network layer manager 126 or 152 may be found in embodiment 200 presented later in this specification.

The hardware components 106 of a typical device 102 may include a processor 160, random access memory 162, and nonvolatile storage 164. The device 102 may also have a hardware network connection 166 and many devices may have a user interface 168. The hardware components 106 may be a typical embodiment, but other devices may have different hardware platforms. In some embodiments, some of the functions of the software components 104 may be implemented in hardware, for example.

Figure 2:
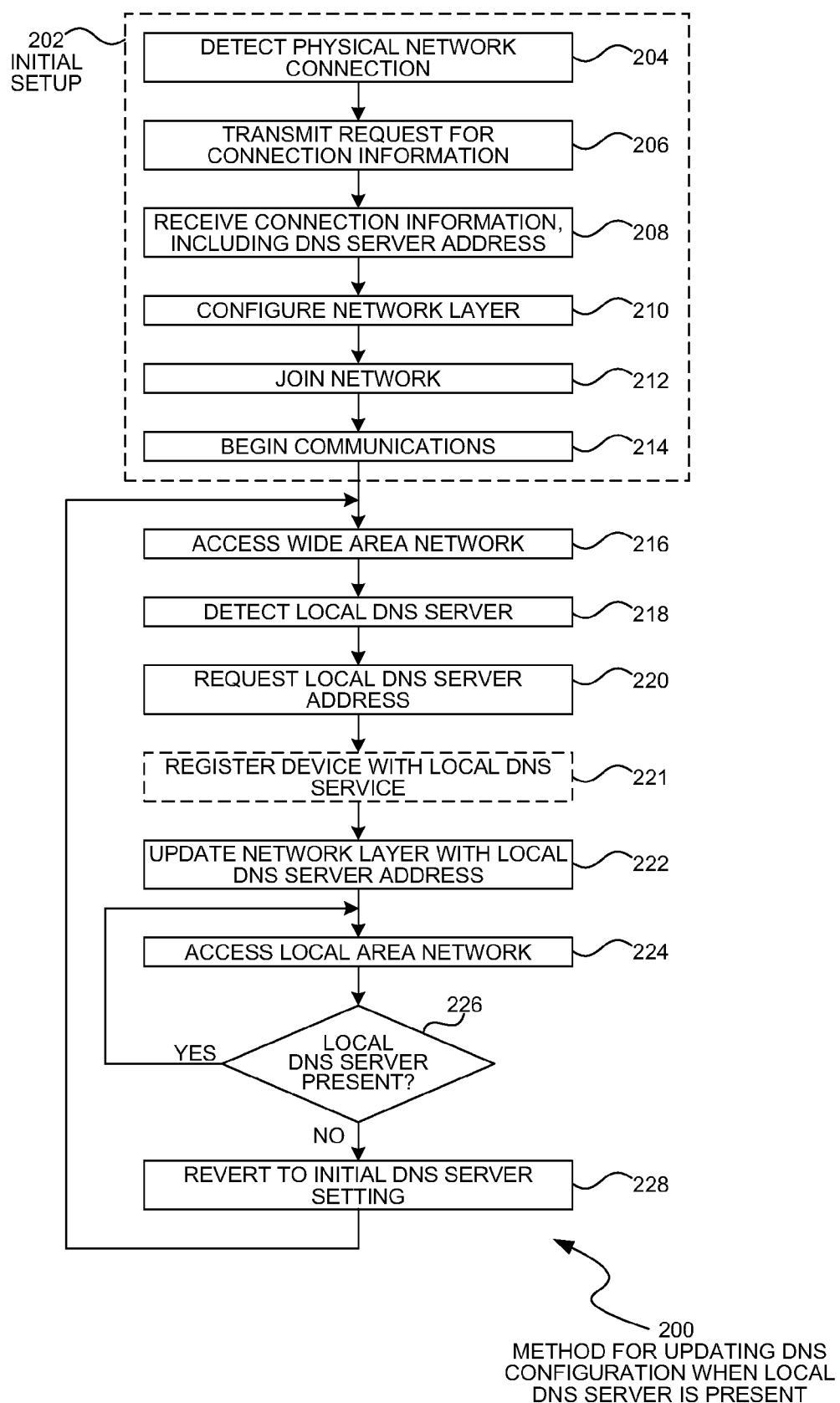
FIG. 2 is a flowchart illustration of an embodiment showing a method for updating DNS configuration when a local DNS is present.

FIG. 2 is a flowchart illustration of an embodiment 200 showing a method for operating device in a local area network with local DNS servers. Embodiment 200 is an example of the processes that may be performed by the configuration client 124 and network layer manager 126 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates an example of a method that may configure a device using initial configuration settings, such as may be obtained from a DHCP or other configuration server. After the initial configuration is performed, the presence or absence of a local DNS server may trigger changes to the network configuration.

The operations of block 202 may be an initial setup operation. These operations may be performed by a configuration client, such as a DHCP client.

The physical network connection is detected in block 204. In many devices, the network connection hardware may send an alert, trigger, interrupt, or other message that may be received by a configuration client.

After detecting the network connection, a request may be transmitted to a configuration server in block 206. The request may include a hardware identifier, such as a Media Access Control (MAC) address or other identifier, as well as other parameters that may be used by a configuration server to provide configuration information. In some embodiments, the request may include a friendly hostname for the device. Such a friendly hostname may be stored by a local DNS service and used to resolve addresses for the hostname.

In block 208, the response may be received from a configuration server. The response may include connection information used to configure a network connection as well as an address for a DNS server. In many embodiments, the initial connection information in block 208 may include an address for a remote DNS server.

In some embodiments, the response in block 208 may include a friendly hostname for the device. In such a case, the hostname may be generated by the configuration server or stored in a database within the configuration server.

The network layer may be configured in block 210 and the device may join the network in block 212 and begin communications in block 214.

Wide area network access may be performed in block 216. In order to access a wide area network, the device may use the remote DNS server address received in block 208.

A local DNS server may be detected in block 218.

In some embodiments, the local DNS server may be detected by passively listening on the network connection for a local DNS server. The local DNS server may periodically broadcast a message that may identify the local DNS server.

In some embodiments, the local DNS server may be detected by actively searching for a local DNS server. In such an embodiment, a device may broadcast a query over the network to which a local DNS server may respond.

When the local DNS server is detected in block 218, the address for the local DNS server may be requested in block 220.

In some embodiments, the device may register itself with the local DNS server in block 221. The registration process may involve transmitting a hostname and address to the local DNS server, among other information. The local DNS server may use the hostname and address to resolve queries from other devices that may attempt to communicate with the device.

The device may update the network layer with the local DNS server address in block 222. The network layer may be updated by adding the local DNS server to a list of available DNS servers, including any other local and remote DNS servers. In some embodiments, addresses for the remote DNS servers may be removed from the network configuration, while in other embodiments, the address for the remote DNS servers may be retained. In some embodiments, the local DNS server may be updated to use the remote DNS server for resolving names outside of a local area network.

With the network layer configured with the local DNS server in block 222, the device may access the local area network in block 224 with the hostnames of other devices within the local area network. When a device attempts to establish communications with another device on the local area network, the device may transmit a hostname to the local DNS server and may receive the local address of the device. The communication may be established using the local address.

If the local DNS server is detected to be not present in block 226, the local DNS address may be removed from the network configuration and the original settings may be reverted in block 228. The operations of block 228 may revert the settings to the settings of block 210.

By reverting the settings in block 210, the device may be able to access the wide area network, such as the Internet, even though the local DNS server is not present.

Figure 3:
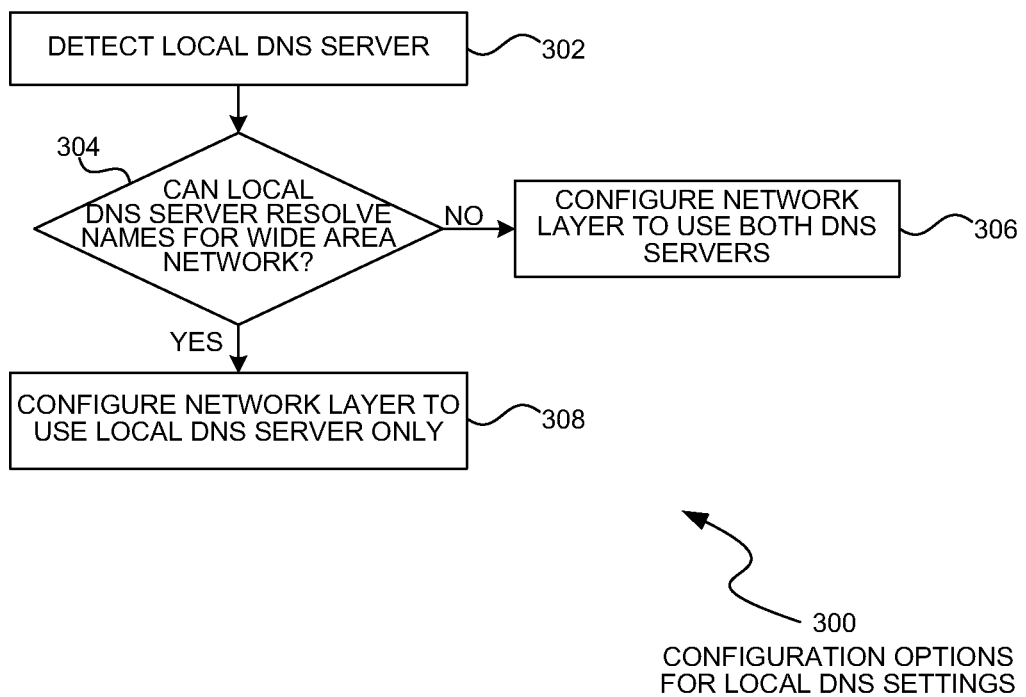
FIG. 3 is a flowchart illustration of an embodiment showing a method for selecting different configurations based on local DNS server capabilities.

FIG. 3 is a flowchart illustration of an embodiment 300 showing a method for configuring various options for a local DNS server. Embodiment 300 is an example of an operation that may be performed during the update process of blocks 218-222 presented in embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A local DNS server may be detected in block 302.

If the local DNS server can resolve names for a wide area network in block 304, the network layer may be configured to use just the local DNS server in block 308.

If the local DNS server cannot resolve names for a wide area network in block 304 and the operating system or application on the client device can support two different DNS servers, the network layer may be configured to use both the local DNS server and the remote DNS server in block 306.

Some operating systems or other software may not support two DNS server resources that have different views of the DNS namespace. In such embodiments, the local DNS server may be updated to include the remote DNS server in a search.

The operations of embodiment 300 may be used in situations where the local DNS server may be queried to determine its capabilities and where network policies may restrict access to the Internet or other wide area network.

Figure 4:
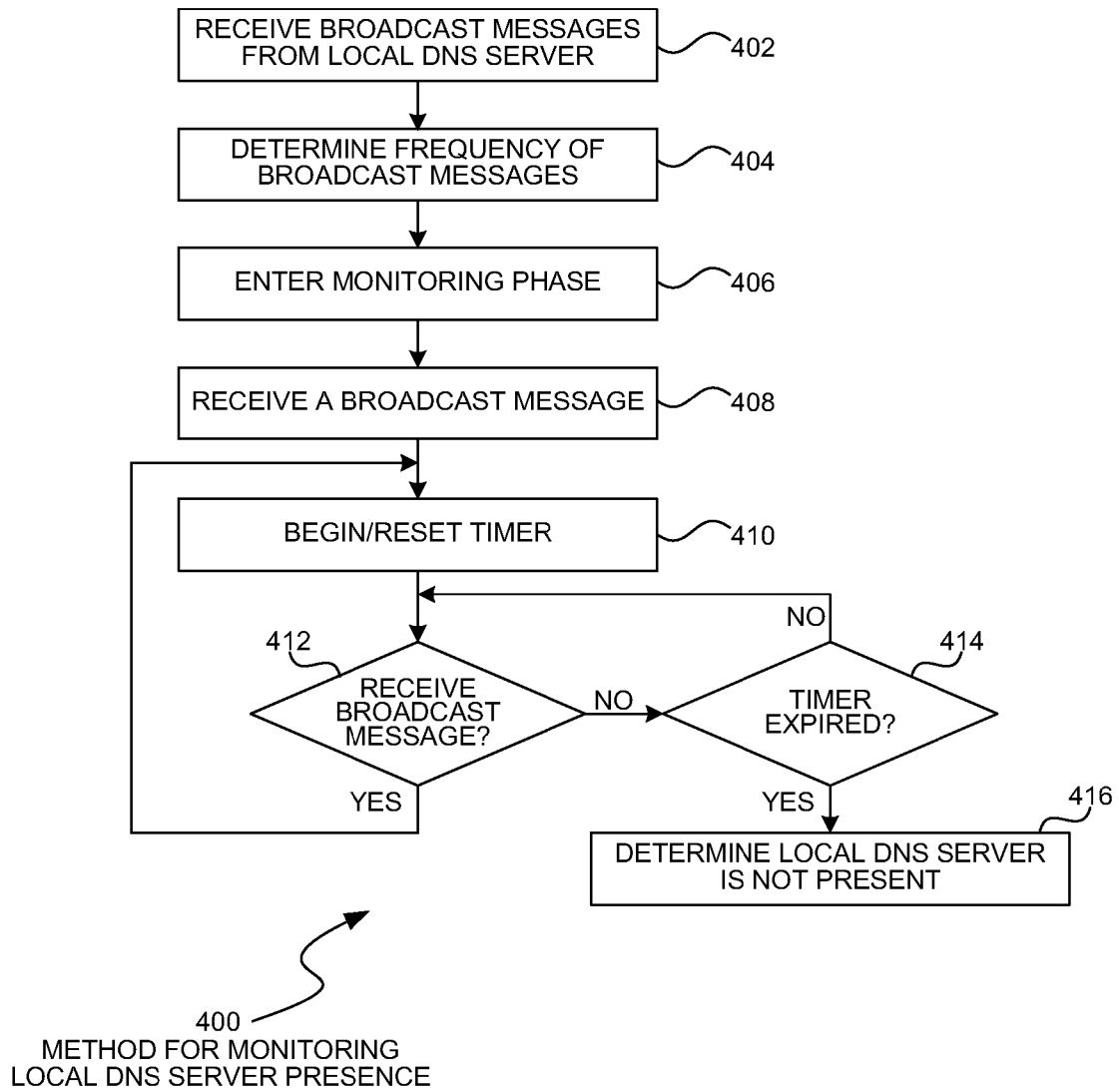
FIG. 4 is a flowchart illustration of an embodiment showing a method for monitoring a local DNS server for presence.

FIG. 4 is a flowchart illustration of an embodiment 400 showing a method for determining if a local DNS server is not present. The operations of embodiment 400 illustrate one example of the operations that may be performed in block 226 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates a method of determining that a local DNS server is not present. Embodiment 400 is an example of a passive method that may receive periodic broadcast messages from the local DNS service.

In block 402, several broadcast messages may be received by a local DNS server and a frequency of the broadcasts may be determined in block 404. Once the frequency is determined in block 404, the monitoring phase may be entered in block 406.

In the monitoring phase, a broadcast message may be received in block 408 and a time may be set in block 410. In many cases, the timer may be a countdown time from a predetermined time, or the timer may be a count up timer.

If another broadcast message is received in block 412, the process may loop back to block 410 and the timer may be restarted.

When the broadcast message is not received in block 412 and the timer is not expired in block 414, the process may loop back to block 412 until one of the conditions is true.

If the broadcast message has not been received in block 412 and the timer has expired in block 414, the determination may be made in block 416 that the local DNS server is not present on the network.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A device comprising:
    a processor;
    a physical network connection;
    a configurable network layer function capable of sending a name query to a name server at a name server address, receiving a network address, and using said network address to transmit a communication;
    a configuration function configured to:
        detect that said physical network connection is connected to a first network;
        transmit a request for connection information over said first network;
        receive a first name server address for a first name server, said first name server being located on a wide area network; and
        configure said configurable network layer function to use said first name server address;
    a network layer manager, the network layer manager being automatically installed on the device when the device connects to the network, configured to:
        detect that a local name server is present on a local area network;
        receive a second name server address for said local name server; and
        configure said configurable network layer function to use said second name server address when said local name server is present on said local area network, the local name server being configured to use the first name server to resolve names located outside the local area network.

2. The device of claim 1, said network layer manager further configured to:
    after detecting that the local name server is present, detect that said local name server is not present on said local area network and configure said configurable network layer function to use said first name server address and not said second name server address.

3. The device of claim 2, said configurable network layer function further capable of:
    attempting said name query using a one name server address, determining that said name query failed, and attempting said name query using a different name server address.

4. The device of claim 3, said network layer manager being further configured to:
    configure said configurable network layer function to use said first name server address and said second name server address when said local name server is present on said local area network.

5. The device of claim 3, said network layer manager being further configured to:
    determine that said local name server is capable of resolving network addresses for devices on said wide area network; and
    configure said configurable network layer function to use said second name server address and not said first name server address when said local name server is present on said local area network.

6. The device of claim 3, said network layer manager being further configured to:
    detect that a second local name server is present on said local area network;
    receive a third name server address for said second local name server; and
    configure said configurable network layer function to use said second name server address and said third name server address when said local name server is present on said local area network.

7. The device of claim 2, said network layer manager being further configured to:
    detect that said local name server is present by receiving a broadcast message from said first local name server.

8. The device of claim 7, said network layer manager being further configured to:
    determine a period for said broadcast message;
    wait a predetermined time from receipt of a first broadcast message and determine that said local name server is not present when said broadcast message is not received during said predetermined time.

9. The device of claim 8, said predetermined time being at least two times said period.

10. The device of claim 2, said network layer manager being further configured to:
    detect that said local name server is present by transmitting a message to said local name server and receiving a response to said message.

11. The device of claim 10, said network layer manager being further configured to:
    after detecting that the local name server is present, determine that said local name server is not present by transmitting a second message to said local name server and not receiving a second response to said second message.

12. A method comprising:
    detecting that a physical network connection is connected to a first network, said first network being a local area network;
    transmitting a request for connection information over said first network;
    receiving a network layer manager over said first network;
    receiving a first name server address for a first name server, said first name server being located on a wide area network;
    configuring a configurable network layer function to use said first name server address;
    performing a first address lookup against said first name server to resolve a first name within said wide area network;
    detecting that a local name server is present on said local area network, the local name server being configured to use the first name server to resolve names located outside the local area network;

receiving a second name server address for said local name server; and configuring said configurable network layer function to use said second name server address when said local name server is present on said local area network.

13. The method of claim 12 further comprising:

after detecting that the local name server is present, detecting that said local name server is not present and configuring said configurable network layer function to not use said second name server address.

14. The method of claim 12 further comprising:

performing a second address lookup against said second name server to resolve a second name within said local area network.

15. The method of claim 13 further comprising:

performing a third address lookup against said second name server to resolve a third name within said wide area network.

16. A device comprising:

a processor;

a network connection;

a DHCP client configured to:
   send a message over said network connection to a local area network;
   receive DHCP parameters in response to said message, said DHCP parameters comprising a first DNS address identifying a remote DNS server available on a wide area network; and
   configure said network connection to use said first DNS address for name resolution;

a network layer manager application, the network layer manager application being downloaded and installed when the device connects to the network;

a network configuration manager configured to:
   connect to said local area network;
   detect that a local DNS server is present on said local area network, the local DNS server being configured to use the first DNS server to resolve names located on the wide area network;
   receive a second DNS address identifying said local DNS server; and
   modify said network connection to use said second DNS address for said name resolution.

17. The device of claim 16, said second DNS address being used for said name resolution within said local area network and said first DNS address being used for said name resolution within said wide area network.

18. The device of claim 17, said network configuration manager being further configured to:

after detecting that the local DNS server is present, detect that said local DNS server is not present on said local area network and modifying said network connection not to use said second DNS address for said name resolution.

19. The device of claim 18, said detect being performed by passive detection.

20. The device of claim 18, said DHCP parameters being transmitted by a gateway device connected to said local area network and said wide area network.

* * * * *